United States Patent
Nakajima et al.

[11] Patent Number: 5,262,823
[45] Date of Patent: Nov. 16, 1993

[54] MANUSCRIPT-READING APPARATUS WITH JAM DETECTION SENSORS

[75] Inventors: Yoshihiro Nakajima, Osaka; Akihiro Takada, Neyagawa; Kunihiro Onishi, Osaka, all of Japan

[73] Assignee: Mita Industrial Co., Ltd., Osaka, Japan

[21] Appl. No.: 754,217

[22] Filed: Aug. 27, 1991

Related U.S. Application Data

[63] Continuation of Ser. No. 583,848, Sep. 17, 1990, abandoned.

[30] Foreign Application Priority Data

Sep. 29, 1989 [JP] Japan .................. 1-256215

[51] Int. Cl.$^5$ .............................................. G03G 15/00
[52] U.S. Cl. ................................... 355/205; 355/316; 271/259
[58] Field of Search ............... 355/206, 207, 205, 316; 271/259

[56] References Cited

U.S. PATENT DOCUMENTS

| | | | |
|---|---|---|---|
| 4,170,414 | 10/1979 | Hubert et al. | 355/206 X |
| 4,465,272 | 8/1984 | Kajita et al. | 271/259 X |
| 4,620,782 | 11/1986 | Kurando et al. | 355/313 X |
| 4,763,160 | 8/1988 | Honjo | 271/259 X |
| 4,775,139 | 10/1988 | Honjo et al. | 271/259 X |
| 4,878,087 | 10/1989 | Sakai et al. | 355/207 |
| 4,937,622 | 6/1990 | Makiura | 355/206 |
| 4,954,848 | 9/1990 | Arima | 355/319 |

FOREIGN PATENT DOCUMENTS

| | | | |
|---|---|---|---|
| 0315427 | 2/1988 | European Pat. Off. | |
| 0172149 | 7/1989 | Japan | 271/259 |
| 2065610 | 11/1980 | United Kingdom | |

Primary Examiner—A. T. Grimley
Assistant Examiner—Robert Beatty
Attorney, Agent, or Firm—Beveridge, DeGrandi, Weilacher & Young

[57] ABSTRACT

An identifying system of a manuscript-reading device, receives signals from a pair of sensors disposed upstream of an optical system on the manuscript conveying path while conveying the manuscript for reading an image. In the event that the downstream side sensor remains OFF a predetermined time after the upstream side sensor turns ON or the downstream sensor remains ON a predetermined time after the upstream sensor turns OFF, an identifying system then identifies the presence of a jammed manuscript. Only when both sensors turn OFF together does the identifying system identify a state of release of the jammed manuscript.

7 Claims, 4 Drawing Sheets

MANUSCRIPT-READING APPARATUS WITH JAM DETECTION SENSORS

This application is a continuation of application Ser. No. 07/583,848, filed Sep. 17, 1990, now abandoned.

BACKGROUND OF THE INVENTION

1. Field of the Invention

The present invention relates to a manuscript-reading apparatus built in copying apparatus and the like, which reads images in the course of conveying a manuscript.

2. Description of the Related Art

When operating a conventional manuscript-reading apparatus such as an image reading apparatus of a copying apparatus, as shown above by the one-dot chained line in FIG. 1, as soon as an operator places a manuscript on a guide plate 1 and inserts it into the copying apparatus, a plurality of paper-feeding rollers 2 through 7 sequentially carry the manuscript forward. A lamp 8 for irradiating light against the manuscript is disposed right below the space between the paper-feeding rollers 3 and 4. Reflective mirrors 9 and 10 for directing image-light reflected from the manuscript to an image-forming lens 11 are installed below the lamp 8. The image-forming lens 11 focuses the image light on a photosensitive drum 13 via a reflection mirror 12, in order to perform light-exposure processes.

A plurality of photosensors PS1, PS2, PS3, PS4 and PS5 are disposed on the manuscript conveying path. These photosensors detect the manuscript conveying condition in order to detect jammed paper. Concretely, for example, while a manuscript is in the conveying path, if the photosensor PS2 still remains OFF a certain while (T) after the PS1 turn ON, it is identified that the manuscript jams itself between the photosensors PS1 and PS2.

When the inserted paper has jammed, the copying operator usually opens the paper-conveying means 100 of the manuscript-reading apparatus to eliminate the jammed paper. According to any conventional system, a sensor (not shown) checks to see that this paper-conveying means 100 is opened by the operator. The manuscript-reading apparatus ends the inhibition of copy operation only when this conveying means 100 is opened.

Nevertheless, if the paper jams itself at a position close to the inlet port, the jammed paper can be pulled out of the copying apparatus by the operator without opening the conveying means 100.

However, even when the jammed paper can be pulled out of the copying apparatus, unless the operator opens the above conveying means 100 of the manuscript-reading apparatus, the image reading operation cannot be resumed.

SUMMARY OF THE INVENTION

The invention has been achieved to solve technical problems inherent to conventional manuscript reading apparatus.

The invention provides a manuscript reading apparatus which comprises a means for conveying a manuscript and an optical system which is installed on the manuscript conveying path to irradiate light against the conveyed manuscript for generating reflective light, wherein the manuscript reading apparatus comprises at least a pair of sensors which are disposed on the manuscript conveying path to detect the presence of the manuscript in transit, and an identifying means which receives signals from the pair of sensors and identifies the presence of a jammed manuscript if one of these two sensors on the downstream side still remains OFF even when the upstream side sensor turns ON, and then, when both sensors turn OFF themselves, it identifies that the jammed manuscript is already eliminated.

According to the manuscript reading apparatus of the invention, a manuscript is conveyed by a conveying means, and when an optical system reads images from the conveyed manuscript, an identifying means receives signals from a pair of sensors disposed on the manuscript conveying path. If the downstream side sensor still remains OFF, even when the upstream side sensor turns ON, the identifying means identifies the presence of jammed paper, and finally identifies that the jammed paper is eliminated from the conveying path when both sensors turn OFF.

Therefore, even when a jammed paper is present, in particular, even when the copying operator pulls out the jammed manuscript from the inlet port without opening the conveying means, the manuscript reading apparatus can correctly identify the state of release of the jammed paper.

BRIEF DESCRIPTION OF THE DRESSINGS

DESCRIPTION OF THE PREFERRED EMBODIMENTS

Referring now to the accompanying drawings, an embodiment of the manuscript reading apparatus of the invention is described below.

Figure 1:
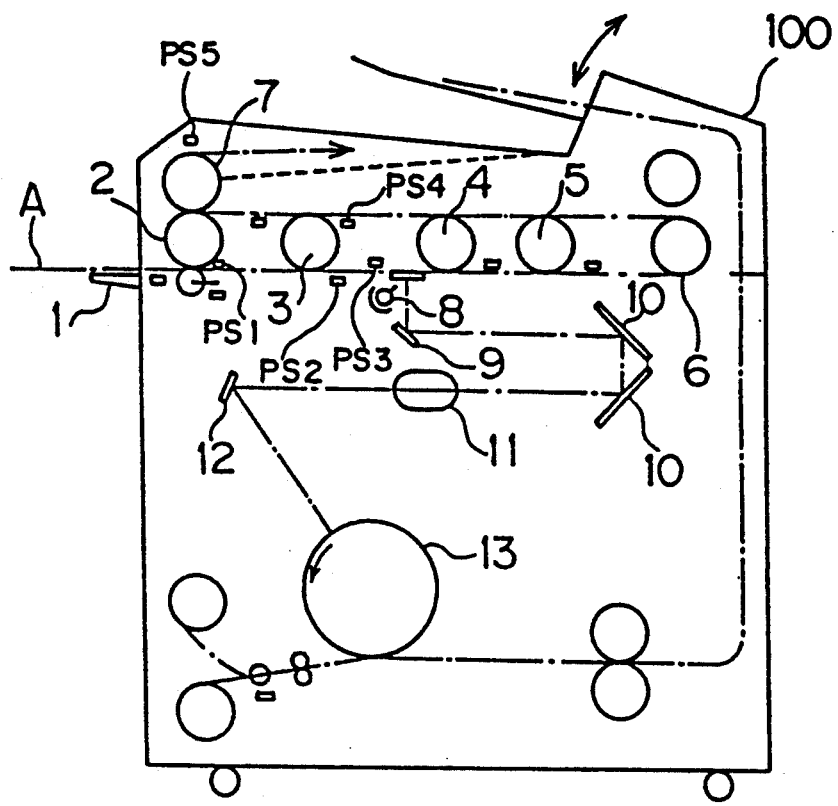
FIG. 1 is the schematic sectional view of a conventional manuscript reading apparatus.
Figure 2:
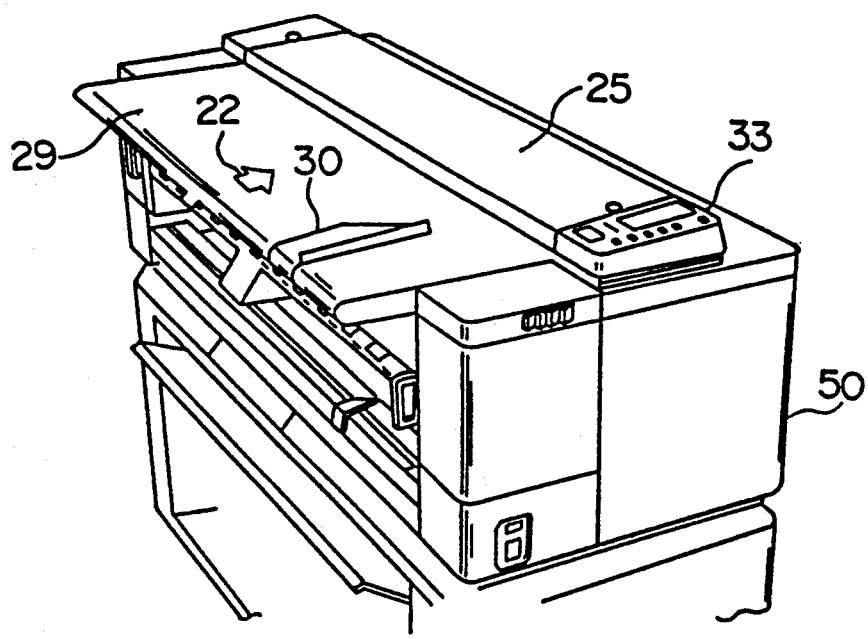
FIG. 2 is a perspective view of a copying apparatus incorporating the manuscript reading apparatus according to an embodiment of the invention.

FIG. 2 is a perspective view of a copying apparatus incorporating the manuscript reading apparatus according to an embodiment of the invention. In FIG. 2, the manuscript reading apparatus incorporating a manuscript conveying means 25 is installed at the top surface of the copying apparatus 50. A control panel 33 equipped with a variety of keys, such as the print activating key, and numerical keys is installed to an end of this conveying means 25. A manuscript guide plate 29 is installed in a position adjoining this conveying means 25. A manuscript subject to copying operation is placed on the manuscript guide plate 29. Cursor 30 detects the size of the manuscript on the guide plate 29. An LED 22 advises the copying operator that the copying operation can normally be performed.

Figure 3:
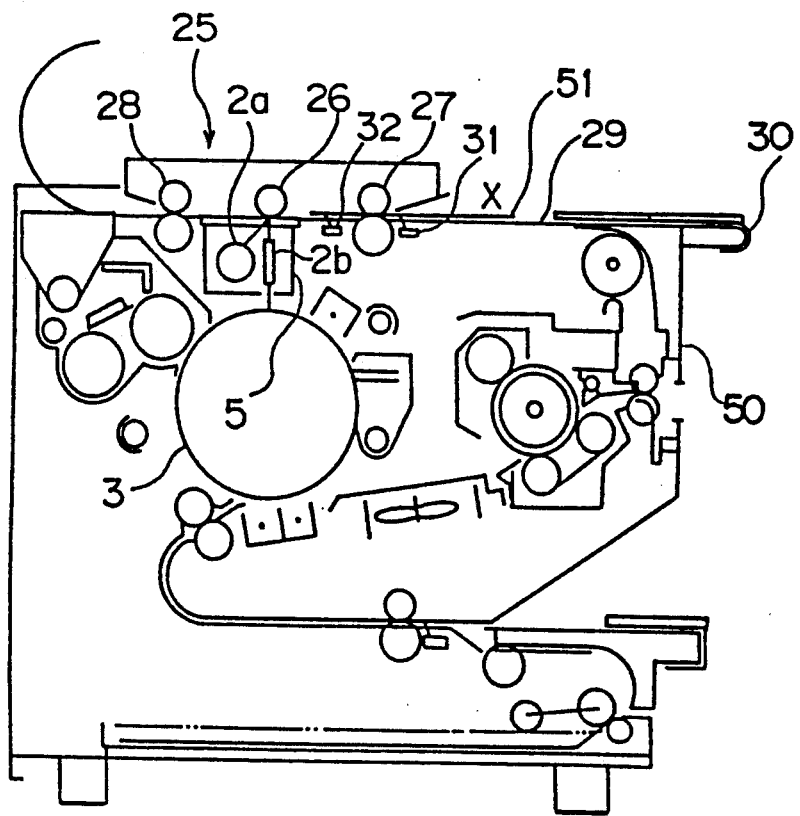
FIG. 3 is the sectional view of the manuscript reading apparatus shown in FIG. 2.

FIG. 3 is the schematic sectional view of the manuscript reading apparatus according to an embodiment of the invention. Drive rollers 27 and 28 are respectively installed to the main body 50 and manuscript conveying means 25 to allow a manuscript 51 to pass through these components.

A manuscript holding roller 26 is installed between these drive rollers 27 and 28 to correctly hold the manuscript in position. These rollers 26, 27, and 28, are disengaged from the driving force while no copying operation is performed so that these rollers can rotate in a reverse direction. The manuscript guide plate 29 is installed immediately before the front drive roller 27 (the front corresponds to the upper-right side of the apparatus shown in FIG. 3 and also to the side where the operator controls copying operation).

A sensor 31 like a limit switch or a photosensor for example is installed immediately before the drive roller 27 to detect whether or not the manuscript 51 is at the position corresponding to sensor 31. The other sensor 32 is installed between the drive roller 27 and the manuscript holding roller 26 to detect whether or not the manuscript 51 is at the position corresponding to sensor 32.

An optical system 5 is disposed right below the manuscript holding roller 26. The optical system 5 comprises a lamp 2a which irradiates light in the direction of the manuscript holding roller 26, and an image-forming lens 2b which focuses the light image reflected from the manuscript 51 to a photosensitive drum 3.

Figure 4:
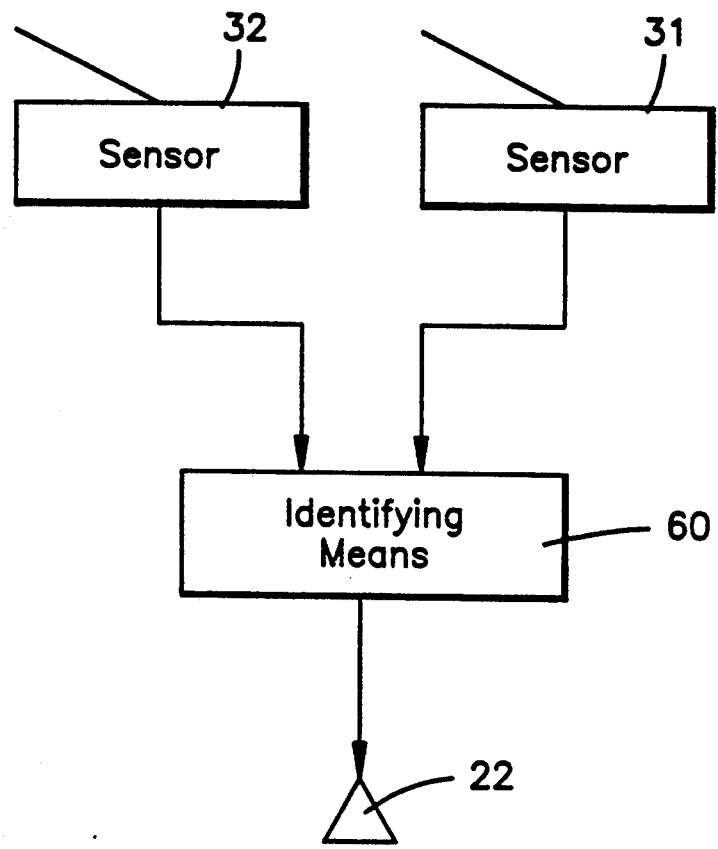
FIG. 4 is a simplified block diagram of the manuscript reading apparatus shown in FIG. 2.

FIG. 4 is the simplified block diagram designating operations of the sensors 31 and 32. An identifying means 60 shown in FIG. 4 receives signals from sensors 31 and 32. Even when the upstream side sensor 31 turns ON, if the downstream side sensor 32 still remains OFF, the identifying means 60 then identifies the presence of a jammed paper. Only when both sensors 31 and 31 turn OFF, does the identifying means 60 identify that the jammed paper is already eliminated. Normally, the identifying means 60 is embodied by using a microcomputer.

The LED 22 advises the copying operator of the presence of a jammed paper by lighting up a red light. It advises the operator that the jammed paper is eliminated by lighting up a blue light (provided that no other failures are present).

Figure 5:
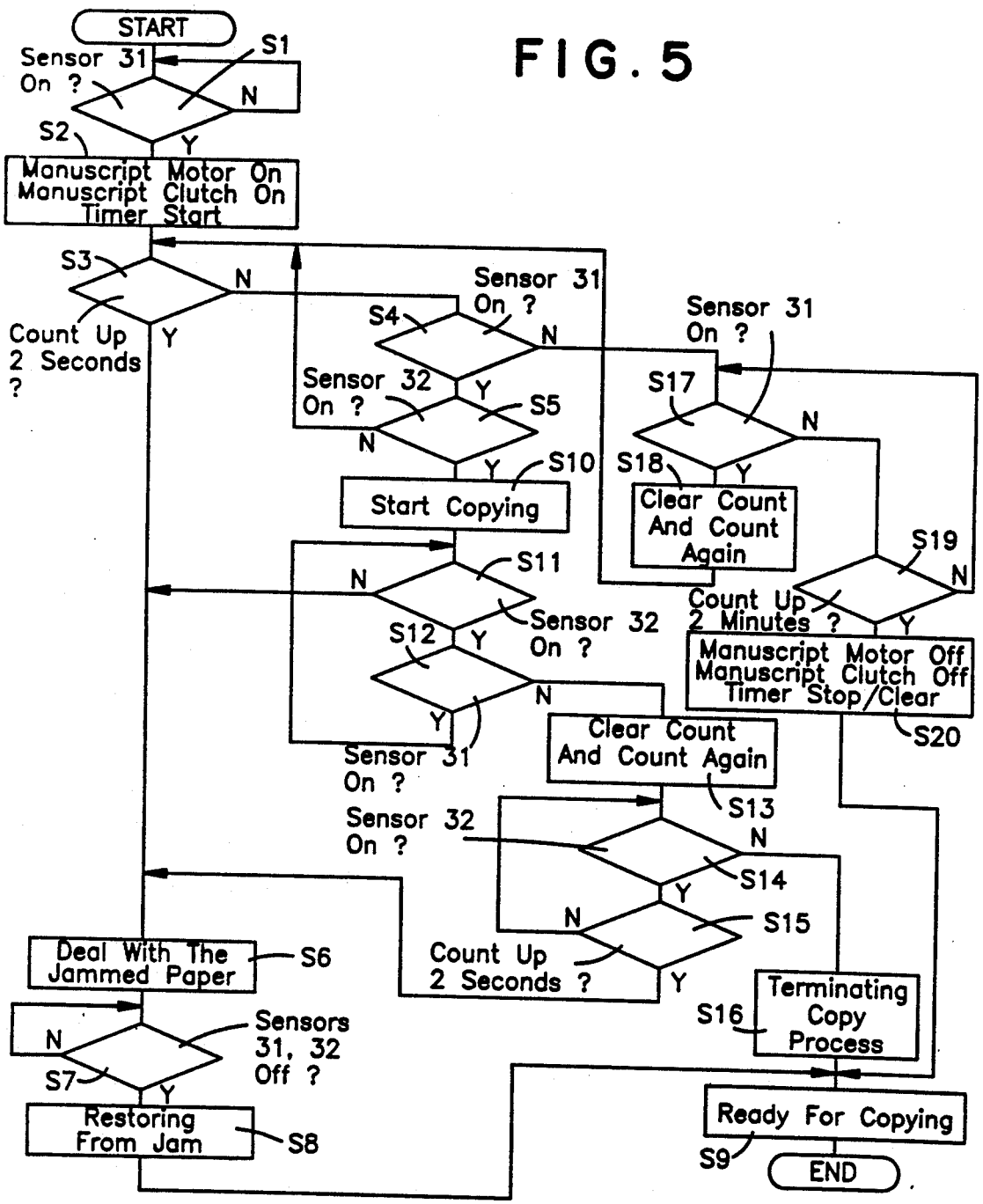
FIG. 5 is a flowchart explaining the functional operation of the manuscript reading apparatus of the invention.

Next, operation of the manuscript reading apparatus embodied by the invention is described below. FIG. 5 presents the flowchart of the operational sequence.

First, the copying operator places the manuscript 51 on the guide plate 29 and then inserts it into conveying means 25. This activates step S1 to cause the sensor 31 to turn ON. As a result, step S2 is entered, in which the drive motor and the clutch for carrying the manuscript are activated to rotate the drive rollers 27 and 28. Simultaneously, a timer starts to count time for detecting the presence of a jammed paper. Next, steps S3 and S4 are entered, in which the timer has not yet counted up 2 seconds, and thus, the sensor 31 still remains ON. Next, step S5 is entered, in which identifying means 60 identifies whether the sensor 32 is ON, or not. Since the sensor 32 remains OFF before the manuscript arrives at the position corresponding to the sensor 32, step S3 is again entered, in which identifying means 60 checks to see if the timer has already counted up 2 seconds, or not. When the manuscript 51 is normally conveyed, these sensors 31 and 32 turn ON before 2 seconds are past. On the other hand, if the paper jams up, the sensor 32 remains OFF causing the timer to count up 2 seconds in steps S4, S5, and S3.

When a jam occurs, identifying means 60 causes the LED 22 to light up the red light. The operator visually identifies that the jammed paper is present, and then manually pulls out the manuscript 51 from the inlet port without opening up conveying means 25 at all, and then eliminates the jammed paper in step S6.

On the other hand, identifying means 60 constantly monitors sensors 31 and 32. Only after confirming that sensors 31 and 32 are OFF and the manuscript 51 has been drawn out of the apparatus in step S7, is the normal condition without presence of jammed paper restored in step S8. As a result, the LED 22 lights up the blue light in step S9 to allow the operator to normally resume the copying operation.

When the manuscript 51 causes the sensor 32 to turn ON in step S5, step S10 is activated so that the copying operation can be resumed. Concretely, the optical system 5 irradiates light and starts to implement light exposure. Even when the sensor 31 turns ON a certain while later, if the sensor 32 still remains OFF in steps S11 and S12, it indicates that the manuscript 51 has jammed up. Then, the apparatus follows up those sequential processes mentioned above.

When the manuscript 51 is normally conveyed in step S12, the sensor 31 turns OFF in step S12. Next, step S13 is entered to again reset the timer. When the sensor 32 turns OFF in step S14, step S16 is entered to allow the copying apparatus to enter into the terminating process taking it that the copying operation is completed. Next, step S9 is entered to allow the copying apparatus to start a copying operation. Nevertheless, after 2 seconds are past, if the sensor 32 does not turn OFF in step S15, identifying means 60 takes it that the jammed paper is present, and then executes those sequential processes to dispose of the jammed paper as mentioned above.

In the event that the copying operator finds that the manuscript 51 is obliquely inserted into the inlet port before the sensors turn ON and he pulls out the manuscript 51 from the inlet port, the sensor 31 turns OFF in step S4 without causing sensor 32 to turn ON before the timer counts up 2 seconds. After pulling out the manuscript 51, if the sensor 31 turns ON from OFF in steps S17 and S19 before the timer counts up 2 minutes, identifying means 60 takes it that the operator has again inserted the manuscript 51 into the inlet port, and then step S18 is entered to reset the timer. Next, the operation mode returns to step S3.

During step S19 if the sensor 31 still remains OFF 2 minutes after pulling out the manuscript 51, then identifying means 60 stops operation of the motor, clutch, and the timer, in step S20. Finally, step S9 is entered, in which the copying enable condition is set.

The manuscript reading apparatus embodied by the invention is not only applicable to any copying apparatus available today, but it is also usefully applicable to other image forming apparatuses like facsimiles or the like as well. Not only a pair of sensors, but more than two sensors may also be used for embodying the invention.

As is clear from the above description, the manuscript reading apparatus embodied by the invention securely identifies not only the presence of jammed paper but also the state of release from the presence of jammed paper by effectively applying the manuscript detecting signals from at least from from a pair of sensors, without opening the manuscript conveying means. Therefore, the manuscript reading apparatus can effectively deal with the jammed paper in the event that conveying means cannot be opened at all.

It is further understood by those skilled in the art that the foregoing description is merely a preferred embodiment and various changes and modifications may also be made without departing from the spirit and scope of the invention.

We claim:

1. A manuscript reading apparatus comprising:
conveying means for conveying a manuscript along a manuscript conveying path,
an optical system means installed on said manuscript conveying path for generating reflective light by irradiating light against a conveyed manuscript,
an upstream sensor provided along said manuscript conveying path for detecting the presence of a conveyed manuscript,
a downstream sensor provided further along said manuscript conveying path than said upstream sensor for detecting the presence of a conveyed manuscript,
both of said sensors being upstream from said optical system and proximal to each other such that both of said sensors may detect a single manuscript concurrently, and
an identifying means for receiving status signals from said upstream sensor and said downstream sensor, wherein said idensifying means identifies
the presence of a jammed manuscript when said downstream sensor continues to remain ON a first predetermined time after said upstream sensor turns OFF, and
the presence of a jammed manuscript when said downstream sensor remains OFF a second predetermined time after said upstream sensor turns ON.

2. A manuscript reading apparatus in accordance with claim 1, wherein said identifying means further identifies removal of a manuscript from said manuscript conveying path when said upstream sensor turns OFF within a third predetermined time after turning ON without said downstream sensor turning ON, thereby identifying the absence of a jammed manuscript.

3. A manuscript reading apparatus in accordance with claim 1, wherein said upstream and downstream sensors are photosensors.

4. A manuscript reading apparatus in accordance with claim 1, wherein said upstream and downstream sensors are comprised of limit switches.

5. A manuscript reading apparatus in accordance with claim 1, further including driving means for driving said manuscript conveying means and
timing means for counting the passage of time,
wherein said timing means and said driving means are actuated when said upstream sensor turn ON.

6. A manuscript reading apparatus in accordance with claim 2, wherein
said identifying means further identifies a starting of a manuscript reading operation when said upstream sensor turns ON within a fourth predetermined time from turning OFF, and
identifies a ready state of the manuscript reading apparatus when said upstream sensor continues to remain OFF even after said fourth predetermined time lapses after said upstream sensor turns OFF.

7. A manuscript reading apparatus incorporating a conveying means for conveying a manuscript and an optical system which is installed on said manuscript conveying path to generate reflective light by irradiating light against a conveyed manuscript, comprising:
at least a pair of sensors which are respectively provided on said manuscript conveying path to detect the presence of the conveyed manuscript including an upstream side sensor and a downstream side sensor provided further along said conveying path than said upstream side sensor, both of said sensors being upstream from said optical system and proximal to each other such that both of said sensors may detect a single manuscript concurrently, and
an identifying means which receives signals from said pair of sensors, wherein said identifying means identifies
i) the presence of a jammed manuscript when the downstream side sensor still remains ON after the upstream side sensor turns OFF, and
ii) that a jam of said manuscript is not present when said manuscript is pulled out after said manuscript has been inserted to an inlet port of said manuscript reading apparatus and the upstream side sensor turns OFF within a predetermined time after the upstream side sensor turns ON without the downstream side sensor turning ON.

* * * * *